(12) United States Patent
Strickland, Jr.

(10) Patent No.: US 7,373,963 B2
(45) Date of Patent: May 20, 2008

(54) APPARATUS AND METHOD FOR TIRE INFLATION

(76) Inventor: David Strickland, Jr., 2827 Cherokee Rd., Birmingham, AL (US) 35223

( * ) Notice: Subject to any disclaimer, the term of this patent is extended or adjusted under 35 U.S.C. 154(b) by 0 days.

(21) Appl. No.: 11/379,149

(22) Filed: Apr. 18, 2006

(65) Prior Publication Data

US 2006/0231212 A1    Oct. 19, 2006

Related U.S. Application Data

(60) Provisional application No. 60/672,410, filed on Apr. 18, 2005.

(51) Int. Cl.
*B60C 25/00* (2006.01)
*B60C 29/00* (2006.01)

(52) U.S. Cl. .............................. 157/1.1; 157/1; 157/20; 141/4; 141/38

(58) Field of Classification Search .................. 157/1, 157/14, 20, 1.1; 141/4, 38, 144, 145, 237
See application file for complete search history.

(56) References Cited

U.S. PATENT DOCUMENTS

| | | | | |
|---|---|---|---|---|
| 1,537,662 A | * | 5/1925 | Flick ............................... | 157/1 |
| 1,669,710 A | * | 5/1928 | Messer ............................. | 73/8 |
| 3,604,245 A | * | 9/1971 | Atelian ............................ | 73/8 |
| 3,726,124 A | * | 4/1973 | Obarski ........................... | 73/8 |
| 4,472,125 A | | 9/1984 | Kubo et al. | |
| 4,506,708 A | | 3/1985 | Onuma | |
| 4,763,710 A | * | 8/1988 | Pielach ........................... | 157/14 |
| 4,789,015 A | | 12/1988 | Flinn | |
| 4,947,919 A | | 8/1990 | Timlin | |
| 5,035,274 A | | 7/1991 | Kinnick et al. | |
| 5,170,828 A | | 12/1992 | Curcuri | |
| 5,395,150 A | | 3/1995 | Imler et al. | |
| 5,603,148 A | | 2/1997 | Hjorth-Hansen | |
| 5,728,220 A | | 3/1998 | Curcuri et al. | |
| 6,029,716 A | | 2/2000 | Hawk | |
| 6,336,481 B1 | | 1/2002 | Tigges | |

FOREIGN PATENT DOCUMENTS

| EP | 143538 A2 | 5/1985 |
|---|---|---|
| JP | 6238699 | 8/1994 |

* cited by examiner

*Primary Examiner*—Hadi Shakeri
(74) *Attorney, Agent, or Firm*—W. Edward Ramage; Baker Donelson

(57) ABSTRACT

An apparatus and method for simply and inexpensively positioning mounted automobile and truck tires for effective setting of a bead, with subsequent inflation in an efficient manner. In one exemplary embodiment, the apparatus is a wheel-like structure with an outer rim in the shape of a polygon, such as a circle, octagon, hexagon, or square. The outer rim supports a plurality of mounting brackets adapted to hold tires for inflation. Tires that have been mounted on wheel rims are placed on the mounting brackets, a bead is set by a blast of air, and an air inflation hose is connected to the tire. The wheel rotates, so that additional tires can be placed on subsequent mounting brackets, resulting in a series of tires being inflated continuously and simultaneously. When a tire is completely inflated, the hose is disconnected and the tire removed from the device for storage, shipping or further handling.

12 Claims, 10 Drawing Sheets

APPARATUS AND METHOD FOR TIRE INFLATION

This application claims benefit of the previously filed U.S. Provisional Patent Application No. 60/672,410, filed Apr. 18, 2005, by David Strickland, and is entitled to that filing date for priority. The specification and drawings of U.S. Provisional Patent Application No. 60/672,410 are incorporated herein in their entirety by reference.

FIELD OF INVENTION

This invention relates to a system and apparatus for filling tires with a specified air pressure. More particularly, the present invention relates to a system and apparatus for inflating multiple tires on a rotary or closed loop device.

BACKGROUND OF INVENTION

In the truck tire industry, tire mounting facilities mount truck tires on suitable rims, inflate the tires, and prepare and package them for shipment to various truck manufacturers or service centers. Due to the competitive nature of the business, the commercial viability of these facilities depends on minimizing costs, reducing production time, and increasing overall efficiency. As shipping costs of the mounted tires comprise a large expense, most such facilities serve a limited geographic area, and thus cannot undertake the burden of large capital investment in machinery.

The step of tire inflation is a critical step in the tire mounting process. Once the tire is mounted on an appropriately-size rim, the tire must be inflated to the proper pressure. This requires a two step process: setting the bead with an initial blast of air, then inflating the tire through the valve stem. As truck tires generally have a sizable volume, the time to inflate a typical truck tire using a standard air hose can be several minutes. As the time to mount a tire is substantially less than the time to inflate it, the tire inflation step can be a chokepoint in the process, and thus substantially reduce production.

Various methods and systems for inflating tires are well known in the prior art. One known method adjusts the inflation device to match a particular size of tire. When the tire size is changed, however, the inflation device must be adjusted and re-calibrated, with a concomitant increase in cost and loss in production time. A related tire inflation device with two inflation chambers accommodates tires of different sizes, but the device is expensive and cumbersome. Such devices also are designed to work in production lines in automobile or tire factories, and thus are not suited for truck tires.

Accordingly, what is needed is a simple and inexpensive device and method for positioning mounted truck tires for effective bead-setting, and then inflating said tires to a set pressure in an efficient manner.

SUMMARY OF THE INVENTION

The present invention provides for a device and system capable of simply and inexpensively positioning mounted automobile and truck tires for effective setting of a bead, with subsequent inflation in an efficient manner. One exemplary embodiment of the invention is a wheel-like structure with an outer rim in the shape of a polygon, such as a circle, octagon, hexagon, or square. The outer rim supports a plurality of mounting brackets. Tires that have been mounted on rims are placed on the mounting brackets, a bead is set by a blast of air, and an air inflation hose is connected to the tire. The wheel rotates, so that additional tires can be placed on subsequent mounting brackets, resulting in a series of tires being inflated continuously and simultaneously. When a tire is completely inflated, the hose is disconnected and the tire removed from the device for storage, shipping or further handling.

Still other advantages of various embodiments will become apparent to those skilled in this art from the following description wherein there is shown and described exemplary embodiments of this invention simply for the purposes of illustration. As will be realized, the invention is capable of other different aspects and embodiments without departing from the scope of the invention. Accordingly, the advantages, drawings, and descriptions are illustrative in nature and not restrictive in nature.

DETAILED DESCRIPTION OF THE INVENTION

Figure 1:
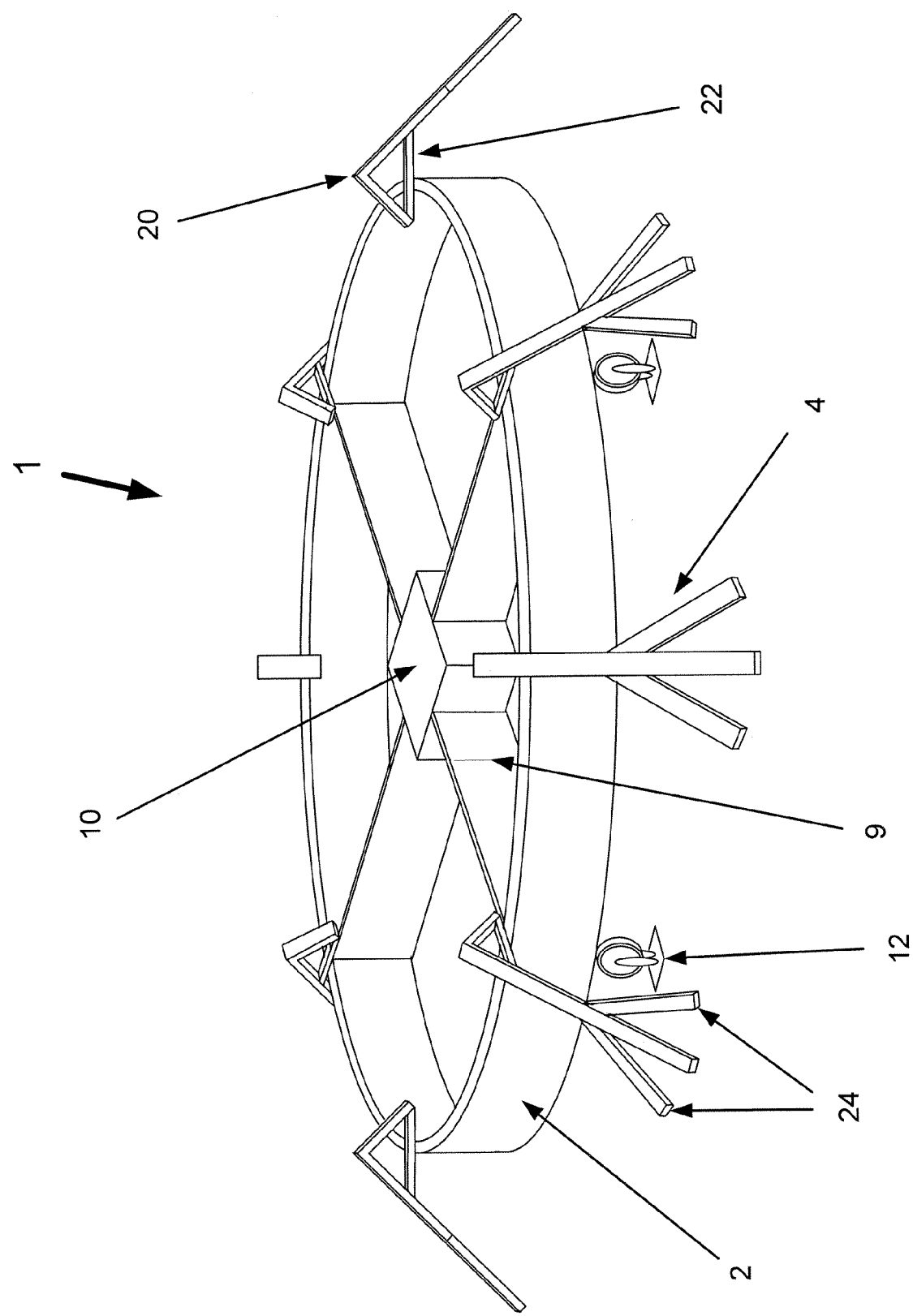
FIG. 1 shows a perspective view of one embodiment of the present invention.

Referring now to the numerous figures, wherein like references identify like elements of the invention, FIG. 1 illustrates an exemplary embodiment of the invention comprising a wheel-like structure 1 with an outer rim 2. The outer rim 2 supports one or more mounting brackets 4 onto which tires that have been mounted on rims (i.e., mounted tires) 6 are placed (see FIG. 7). The operator sets the bead on the tire 6 after it has been placed on the mounting bracket 4, then connects an air inflation hose 8 to the tire to begin inflation of the tire. In an alternative embodiment, the bead can be set on the tire 6 prior to the tire 6 being placed on the mounting bracket 4. The wheel structure 1 rotates, so that additional tires can be placed on mounting brackets 4 sequentially, have the bead set (if the bead is being set while on the mounting brackets 4), and be connected to additional air inflation hoses 8, with multiple tires thus being inflated simultaneously and continuously at different stages. When a tire 6 is inflated to the proper pressure, it is disconnected from its air inflation hose 8 and removed from the wheel 1 for storage, shipping, or further handling.

Figure 2:
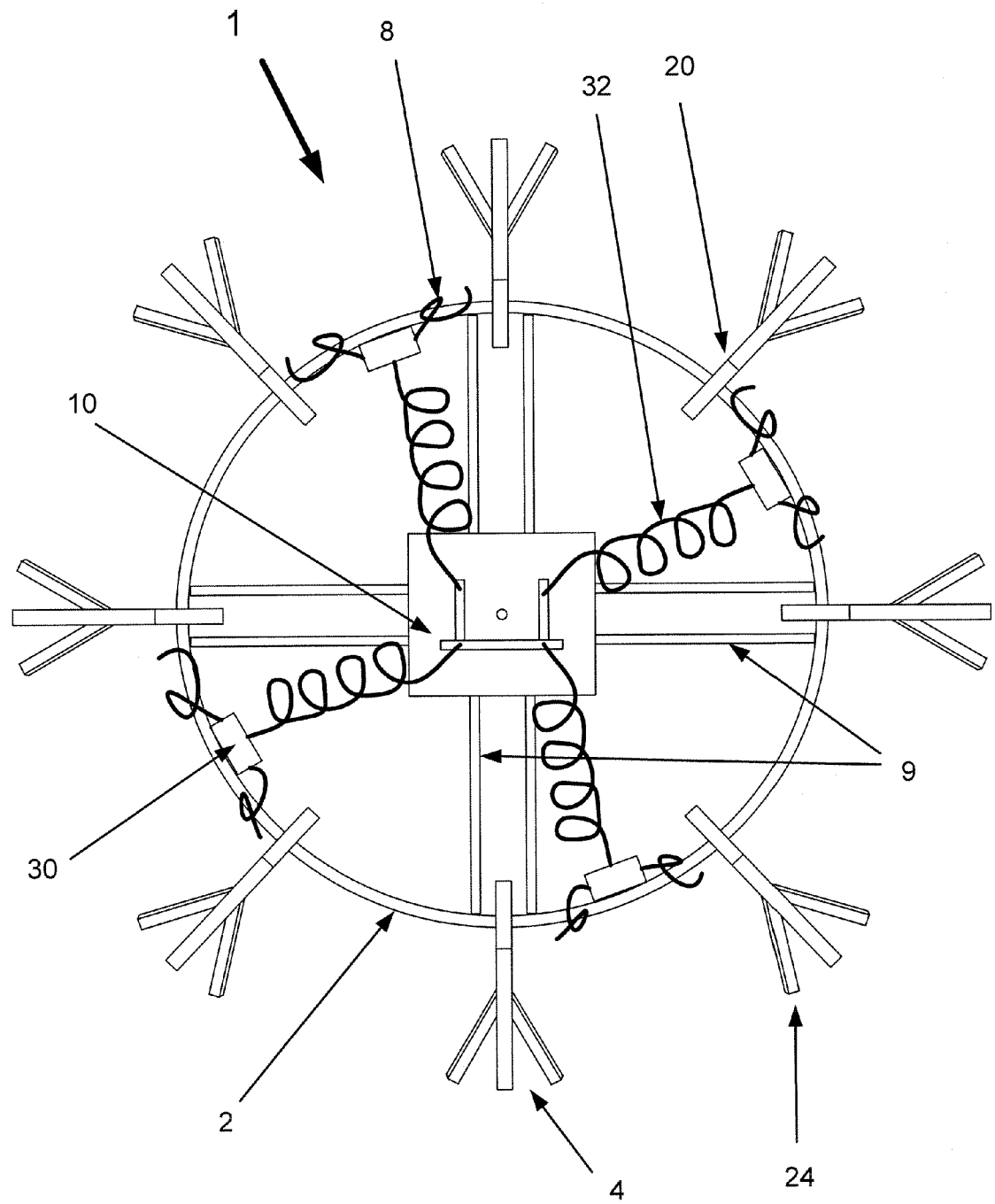
FIG. 2 shows a top view of the invention of FIG. 1.
Figure 3:
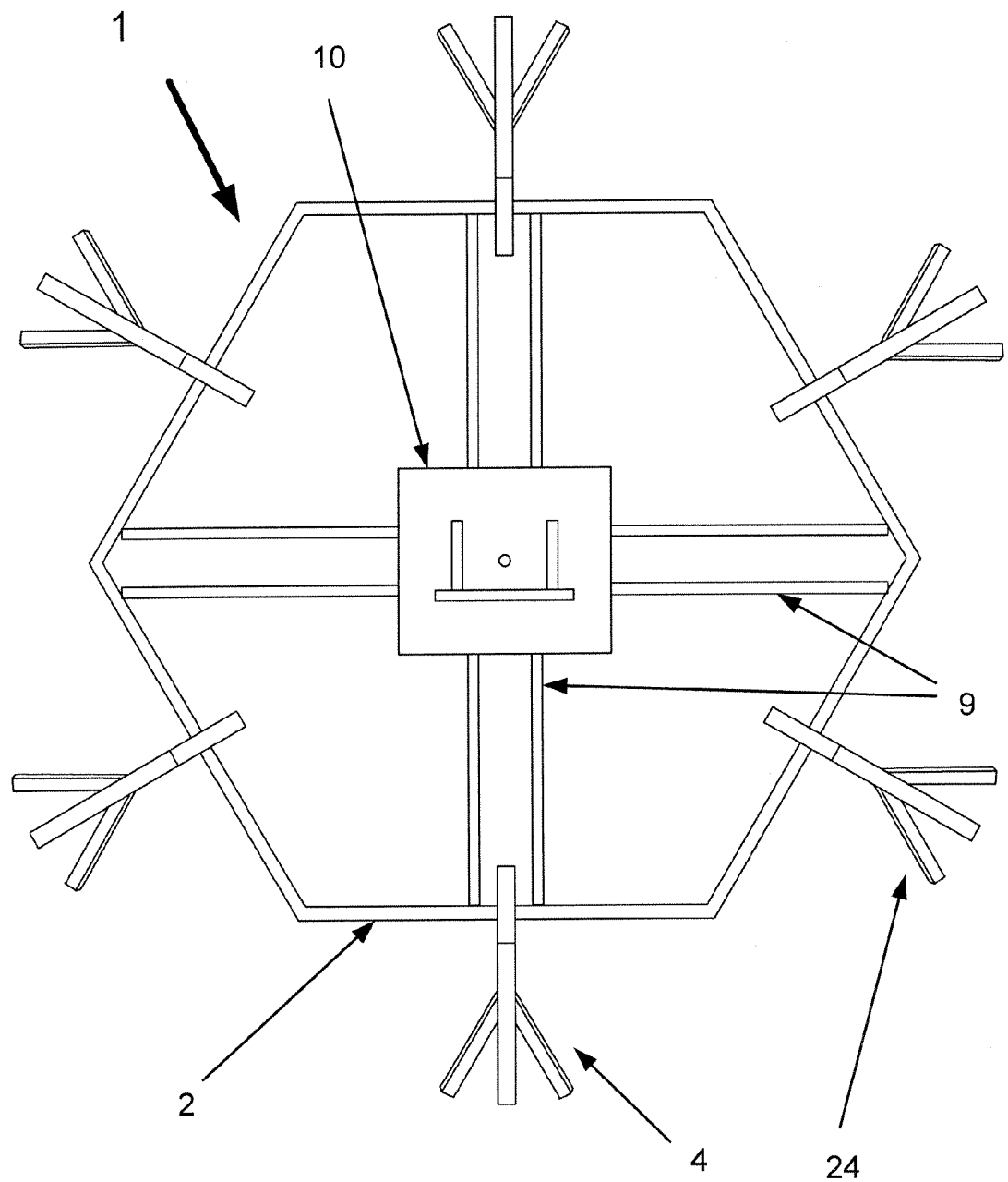
FIG. 3 shows a top view of another embodiment of the present invention.

FIGS. 1 and 2 show the outer rim 2 of the wheel 1 as circular, but the outer rim 2 may be of any suitable shape or configuration. For example, the outer rim 2 can be polyhedral, such as an octagon or hexagon (see FIG. 3), an oval, or even a square. In one exemplary embodiment, the outer rim 2 is in the form of a circle fashioned from curved pieces of steel or iron I-beams, although the outer rim 2 may be made of any material of suitable strength and durability to support multiple tires. In an alternative embodiment, where the outer rim 2 is polygonal in shape, the I-beams can be straight.

Figure 7:
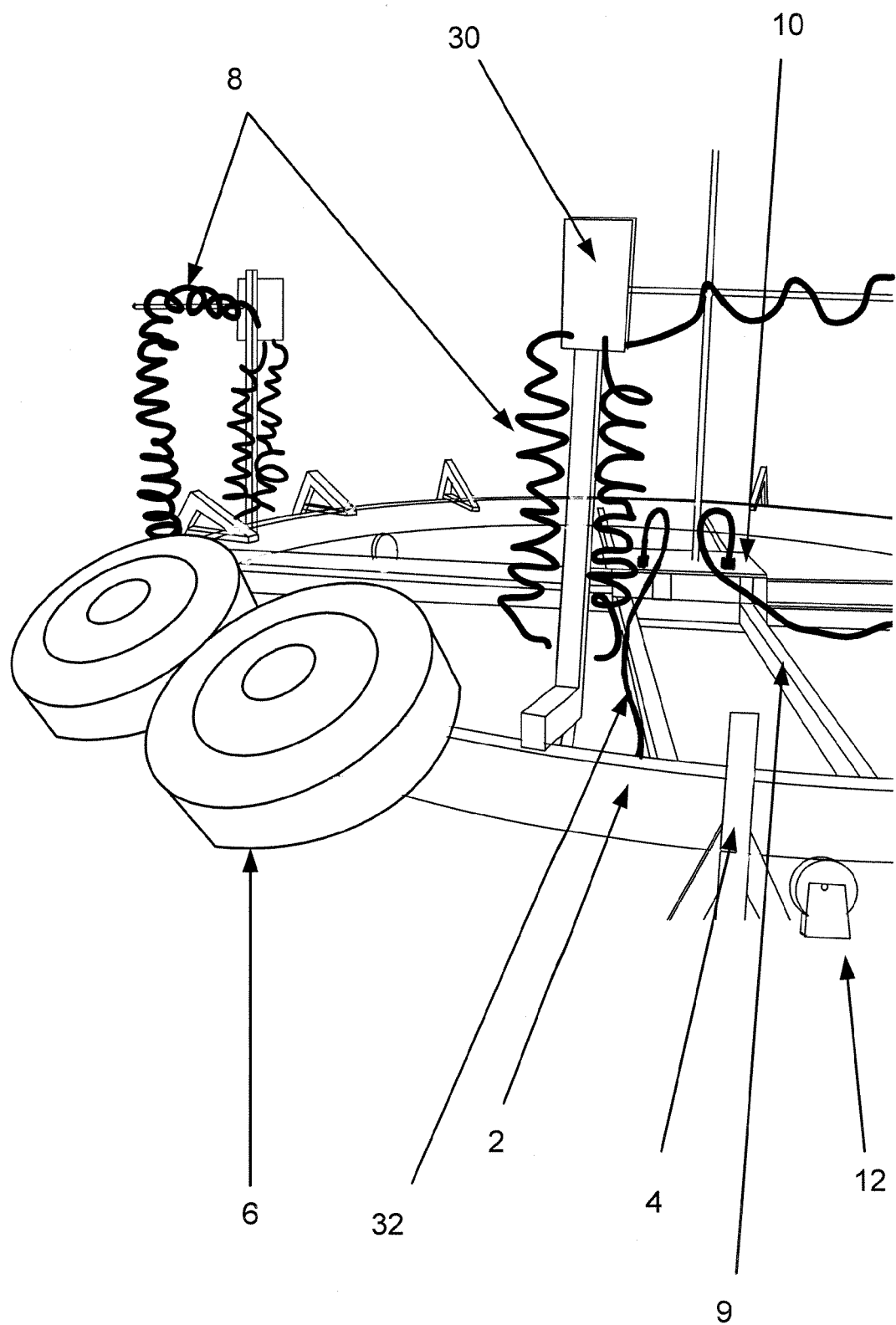
FIG. 7 shows a perspective view of another embodiment of the present invention.
Figure 8:
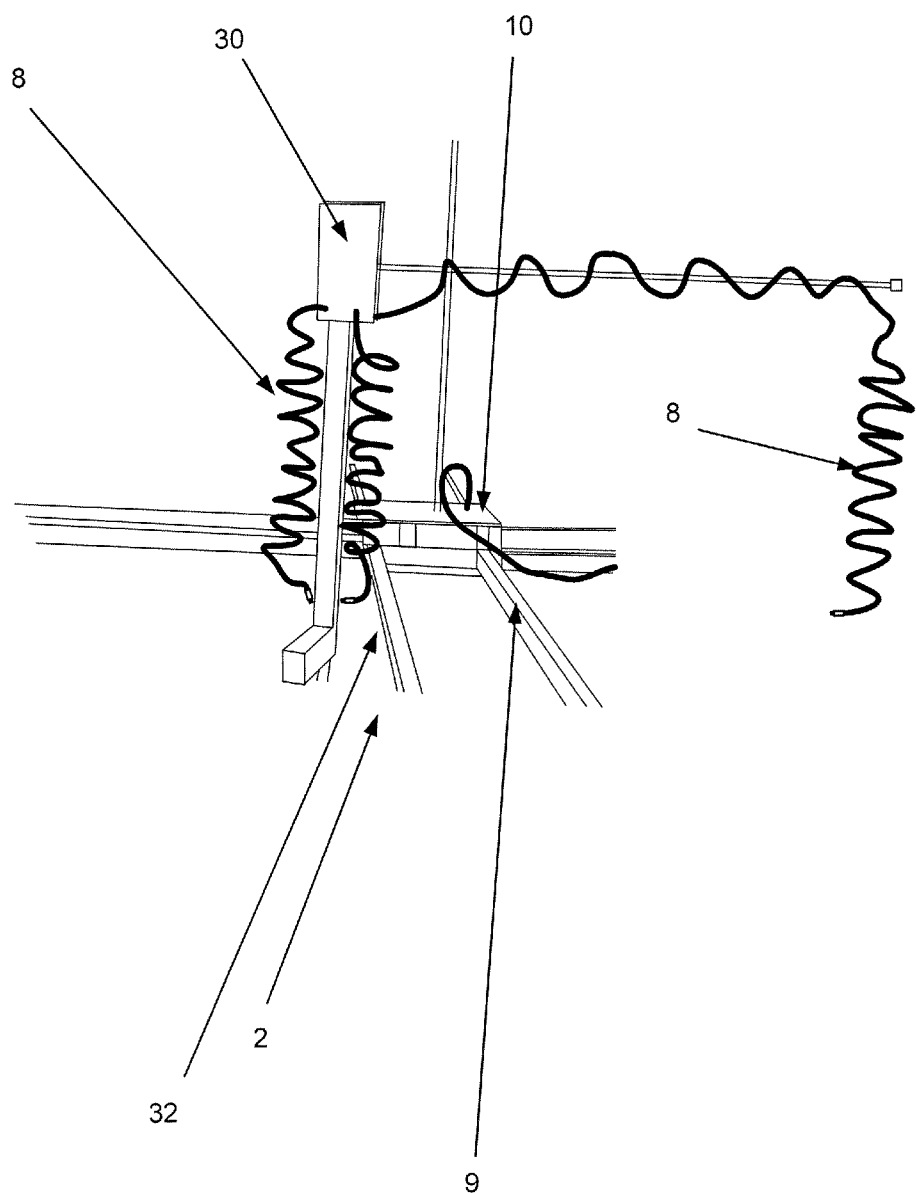
FIG. 8 shows a view of a remote manifold from FIG. 7.
Figure 9:
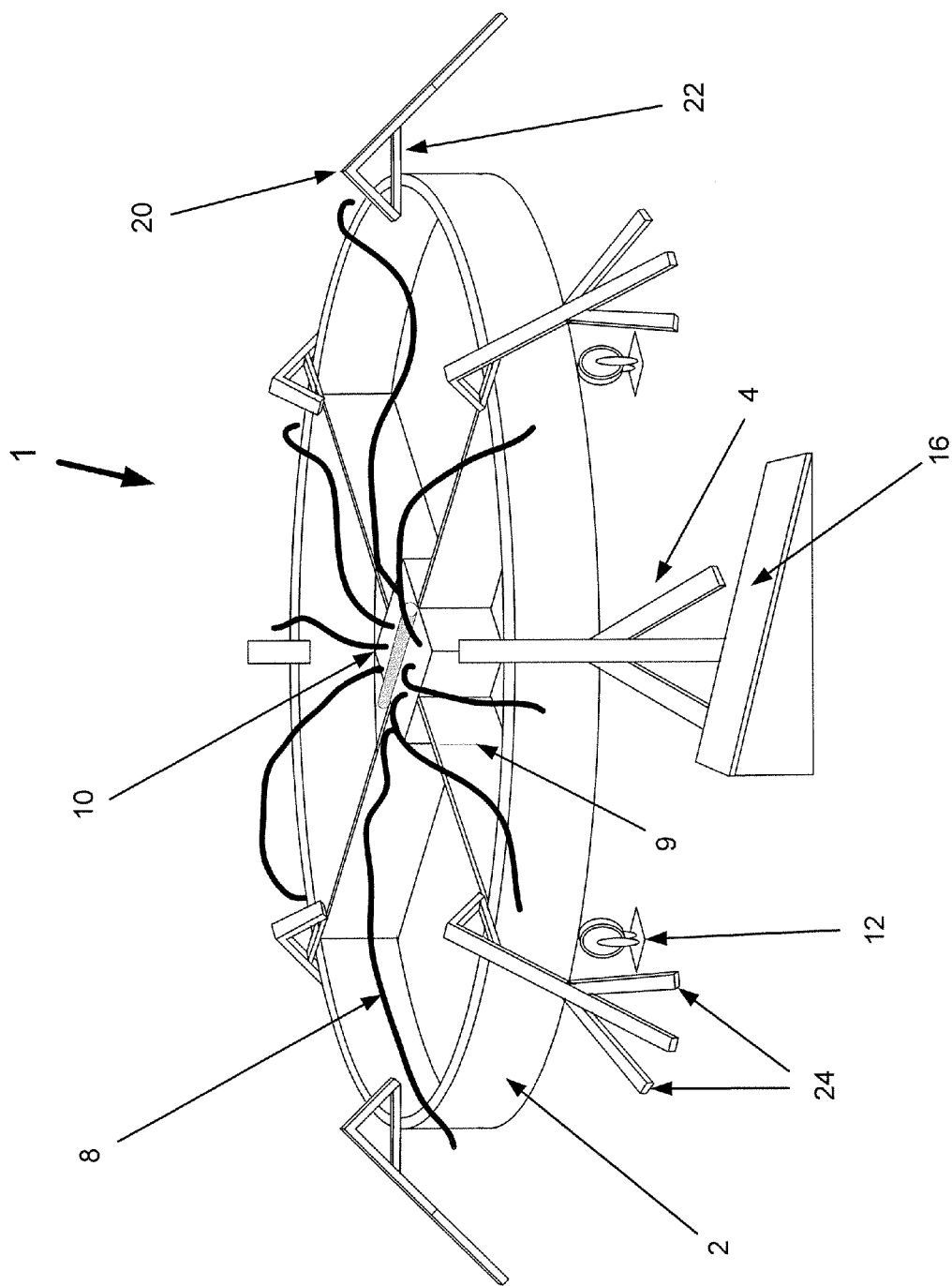
FIG. 9 shows another perspective view of an embodiment of the present invention with a loading ramp.

The interior of the wheel 1 may be a solid disc, or alternatively, may comprise an arrangement of a plurality of spokes or struts 9 connected at various points along the outer rim 2. In one exemplary embodiment, the spokes or struts 9 may connect the outer rim 2 to a center hub 10. The number of spokes or struts 9, and their placement, may vary depending on the size of the device, and the number of tires to be handled. The number of struts or spokes can affect the weight and cost of the device, and affect its stability. Each strut or spoke can comprise multiple parallel bars or structures, as seen in FIG. 7.

In another exemplary embodiment, the outer rim 2 may be supported by a plurality of support wheels 12. Support wheels 12 or rollers may be fixed to the bottom side or edge of the outer rim 2, and rest upon and move along a supporting floor or surface. In an alternative embodiment, the support wheels 12 may be positioned to run on a track. In yet another alternative embodiment, the support wheels 12 may be fixed to the floor or supporting surface or frame, and remain fixed in place while the wheel or roller portion is in contact with and rotates with the bottom side or edge of the outer rim 2.

In another exemplary embodiment, the outer rim 2 and support wheels 12 are suspended from above. The support wheels 12 may be affixed directly to the ceiling, support beams, or other building structural members, or suspended from a support bracket of a size, shape and configuration appropriate for the outer rim 2. The support bracket, in turn, may be mounted directly to the ceiling, support beams, or other building structural members.

In yet another embodiment, the mounting brackets 4 may be supported by a track or monorail (in a similar shape or configuration as the above-described outer rim 2), with the brackets 4 supported on the track by various support means, such as a wheel or wheels. The brackets 4 could then be moved around the track in a manner similar to the rotation of the outer rim 2. The track could be placed on the floor or support surface, in which case the wheel or wheels on the brackets 4 would be located on the bottom of the brackets 4. The track may also be raised above the floor or supporting surface or frame, and the wheels on the bracket 4 placed accordingly. The brackets 4 may be connected by rigid or flexible connecting means, such as a bar, a hinged bar, a chain, or a wire.

The number, size, placement and shape of the mounting brackets 4 vary with the size of the device, the number and types of tires to be handled, and the inflation time. In a preferred embodiment, there are sufficient mounting brackets 4 so that tires are fully inflated and ready for removal from the device before the device completes one complete 360-degree revolution. In one preferred embodiment, as seen in FIGS. 7-10, the diameter of the wheel 1 is approximately 16 feet, with 15 mounting brackets 4 equally spaced around the outer rim 2. Four pairs of spokes extend from a central hub to the outer rim 4, dividing the wheel into four equal quadrants. Tires are fully inflated and are removed from the wheel 1 after approximately a three-quarter rotation.

Figure 4:
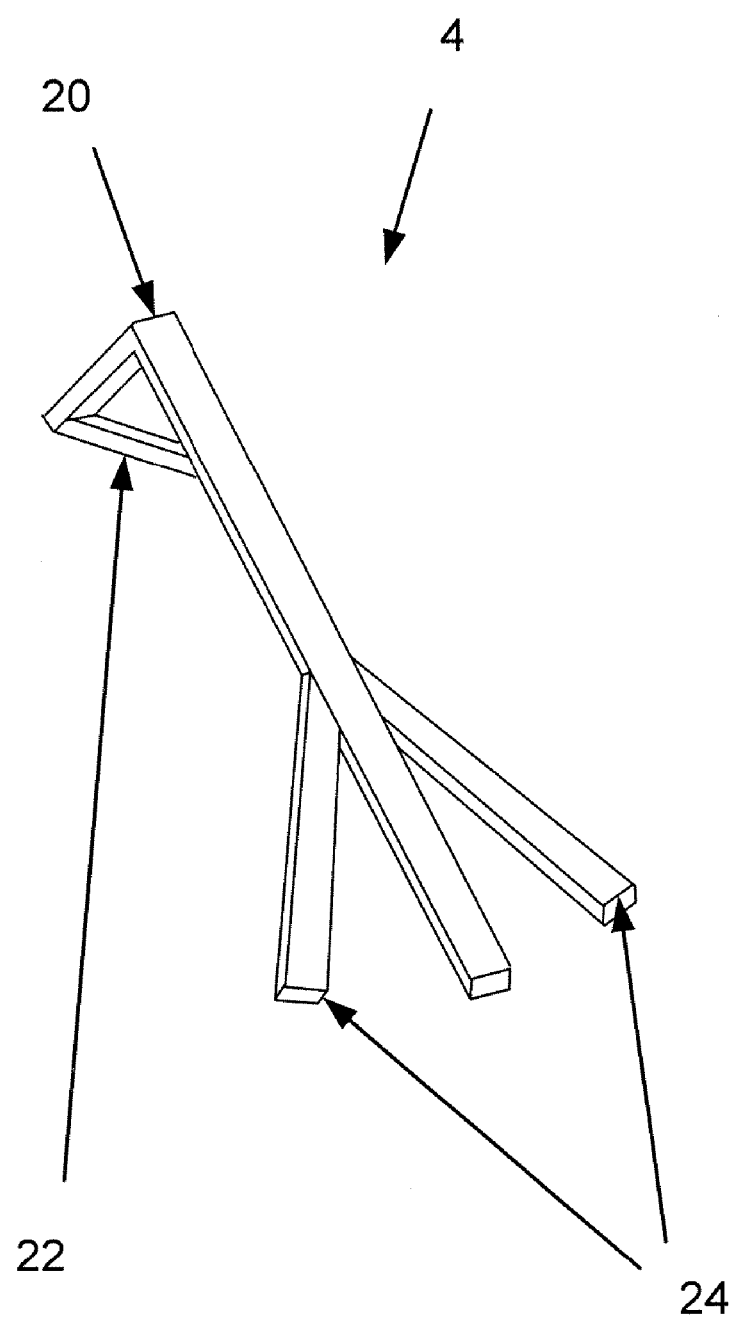
FIG. 4 shows a mounting bracket of one embodiment of the present invention.

In an exemplary embodiment, as seen in FIG. 4, a mounting bracket 4 comprises a bar or length of steel, metal, or similar material with a single bend of approximately 90-degrees (although the angle of the bend can vary) so as to form an approximate "L" shape. The "L" is inverted and the short or base side of the "L" is affixed or mounted to the top side or edge of the outer rim 2 at an angle so the elbow or bend of the "L" 20 faces outward and is elevated above the level of the top side or edge of the outer rim 2. In one preferred embodiment, the angle of the short or base side of the "L", relative to the horizontal or the top side or edge of the outer rim, ranges from approximately 15 degrees to 45 degrees. The exact angle may vary, but it should function to hold an uninflated tire at an angle to ensure proper beading. When the proper angle is used, the inner edge of the tire (i.e., the edge facing the outer rim 2) should be in complete and full contact with the metal rim on which the tire has been mounted, while a gap remains between the outer edge of the tire and the metal rim. This ensures that no air escapes from the inner or back edge of the tire when the operator injects a blast of air through the gap to set the bead. If the tires are placed horizontally on a flat surface of some sort, the inner or back edge of the tire is not in full contact with the metal rim and setting the bead is less efficient.

Figure 5:
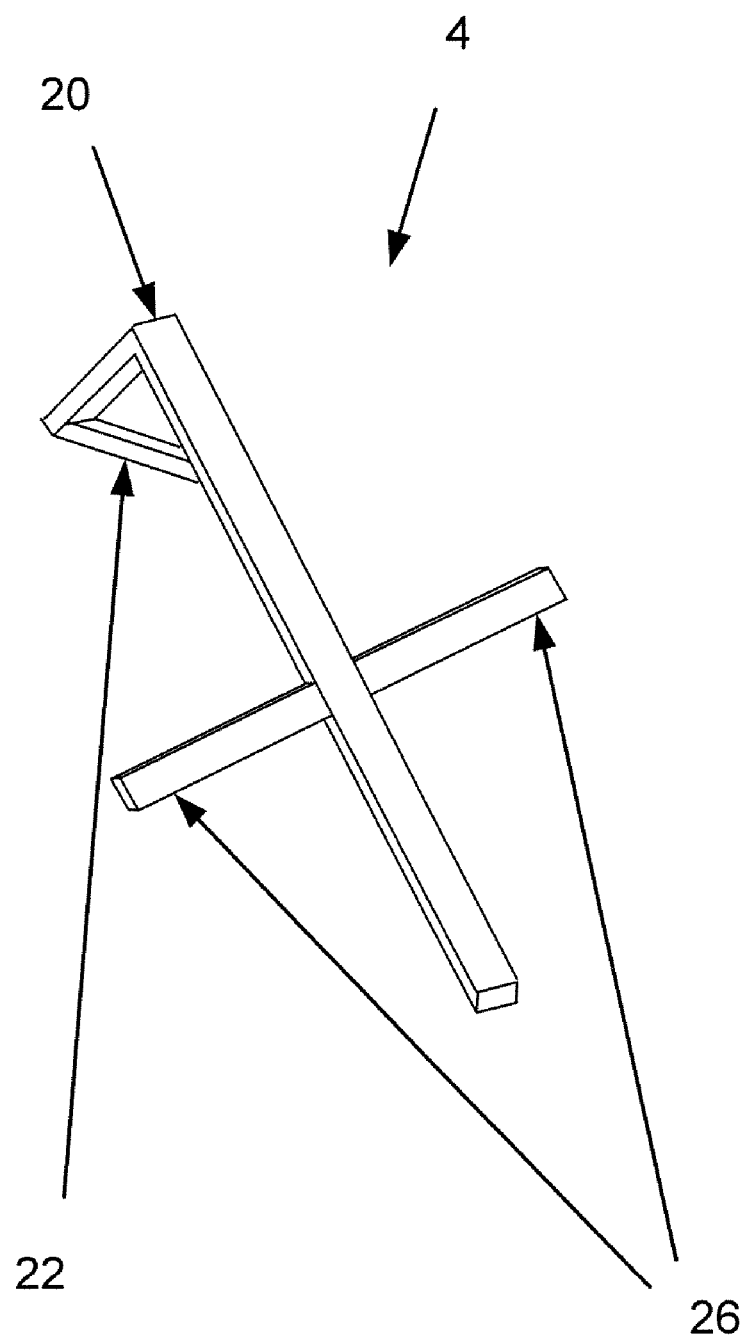
FIG. 5 shows another mounting bracket in accordance with one embodiment of the present invention.
Figure 5A:
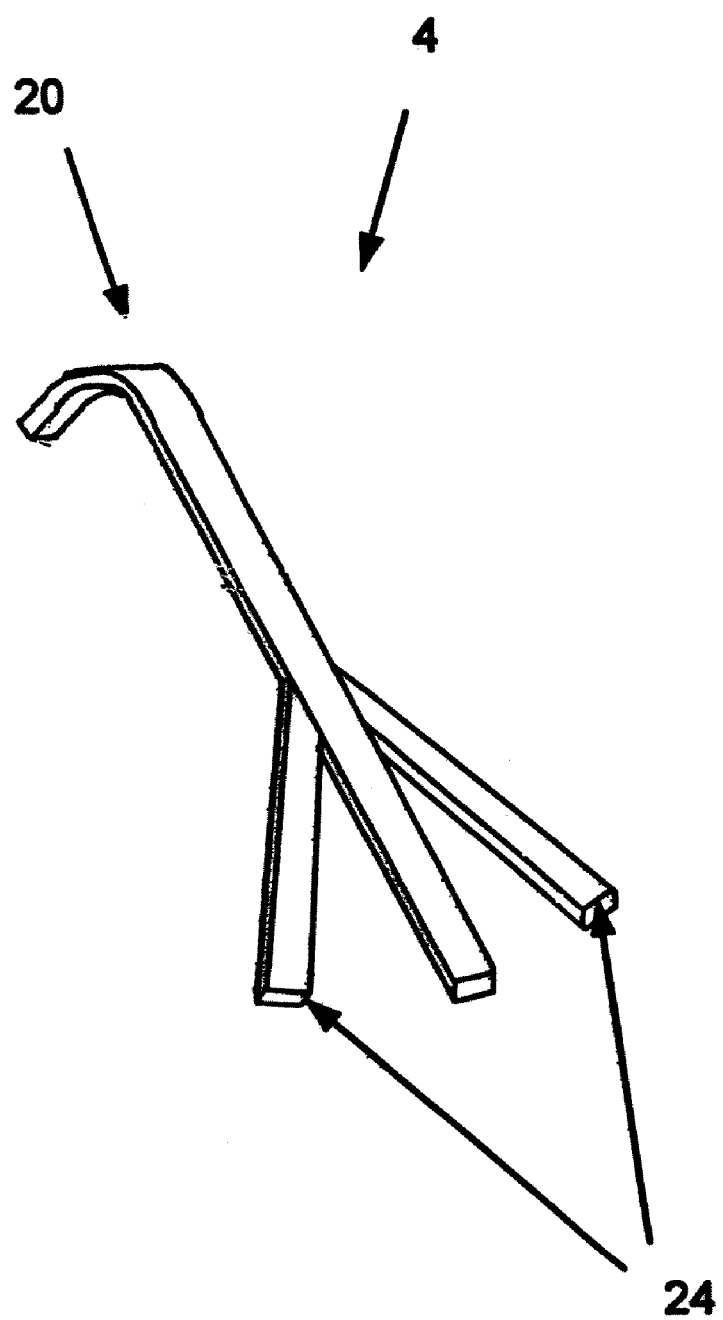
FIG. 5a shows another mounting bracket in accordance with another embodiment of the present invention.

In yet another embodiment, in order to enhance the stability and strength of the mounting brackets, the mounting bracket 4 further comprises a horizontal bar 22 connecting the outer end of the short or base side of the "L" to a point somewhere along the inside of the longer side of the "L." This horizontal bar may then be the means by which the mounting bracket 4 is affixed to the outer rim 2. The mounting bracket 4 may further comprise some means to stabilize the tire when mounted on the bracket, including but not limited to some structure, plate or bar placed at the bottom-most end of the bracket (i.e., the top end of the long side of the "L") to keep the tire from moving laterally. In one embodiment, this may be a simple crossbar 26 perpendicular to the bracket end (see FIG. 5). In another exemplary embodiment, as shown in FIGS. 1 and 4, the stabilizing means comprise two bars affixed to the bracket at one end and running off at corresponding angles on opposite sides to form an inverted "Y" 24. And in yet another embodiment, the "top" of the L-shape may be curved, as seen in FIG. 5*a*.

In embodiments where the beading takes place prior to the tire being placed on the mounting brackets 4, the configuration of the mounting bracket may be simpler than described above, and comprise any configuration designed to hold the tire on the subject invention during inflation. The mounting bracket thus may be a simple hook, rod, angled rod or plate, or similar device.

The air inflation hoses 8 can vary in length, number, and placement, depending on the size and configuration of the device. In one exemplary embodiment, the number of air inflation hoses 8 should be sufficient to service the number of tires that are expected to be mounted on the device simultaneously. In this configuration, the number of hoses will be no more than the number of mounting brackets.

In one exemplary embodiment, the hoses 8 emanate from an air pressure manifold located or suspended above or to one side of the wheel 1. The hoses 8 should be long enough to reach from the manifold to a wheel at any location on the wheel 1, and should be placed so as to minimized the possibility of multiple hoses becoming entangled. Accordingly, suspension above the center of the wheel is a preferred location. In a preferred exemplary embodiment, the manifold 34 itself is rotatable, and rotates in conjunction with the wheel. The manifold's connection 38 to an outside air supply will need to be designed to accommodate this rotary motion, such as with a rotary valve.

Figure 6:
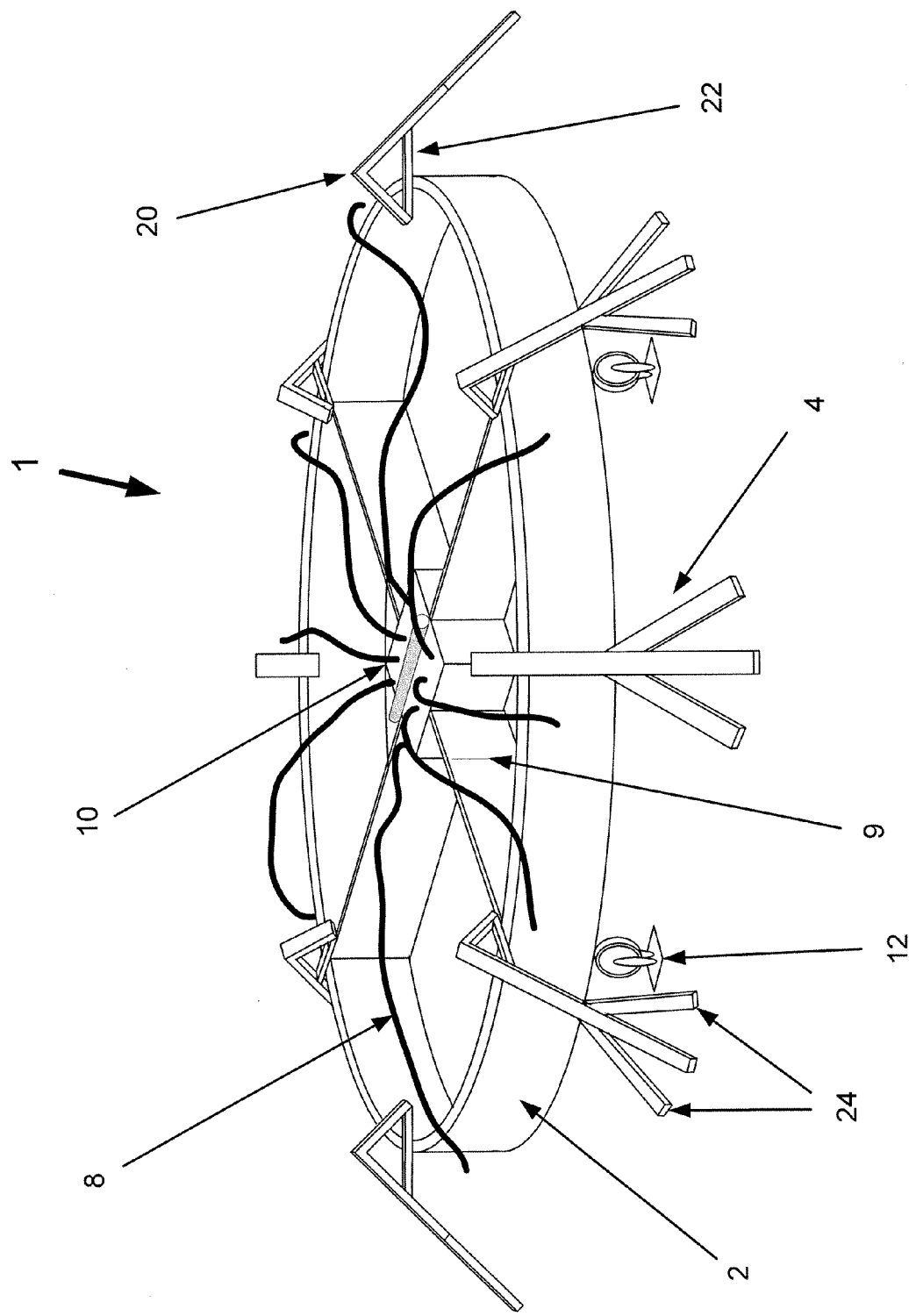
FIG. 6 shows a perspective view of one embodiment of the present invention.

In another exemplary embodiment, the hoses 8 emanate from an air pressure manifold located on the wheel 1 itself. While the manifold can be located at various locations on the wheel 1, a preferred location is the center or hub of the wheel, as seen in FIG. 6. In yet another embodiment, the hoses 8 emanate from a number of remote air pressure manifolds 30 placed at various locations on the outer rim, or elevated above the outer rim (see FIGS. 2 and 7). These remote manifolds may then be connected to a central manifold 34 located at the hub of the wheel, or suspended above or to one side of the wheel. Hoses 32 connecting the central manifold 34 to the remote manifolds 30 may run along or inside the spokes or struts, as seen in FIG. 7. This reduces the length of the hoses 8 actually connected to the tires while mounted on the mounting brackets 4. The number of hoses 8 emanating from each remote manifold may vary, depending on the number of mounting brackets and tires that particular manifold is expected to service.

Air pressure hoses are attached to the valve stem of the tire and inflate the tire to an appropriate, pre-set pressure. The hoses may be attached at any time before or after the bead has been set by the operator, depending on the time and manner in which the bead is set. This pre-set pressure may vary, depending on the tires being serviced, and can be set by the operator at the manifold or through remote means. In one exemplary embodiment, inflation of the tire is automatically cut-off when the pressure in the tire reaches the pre-set pressure.

Tires mounted on rims can be placed on mounting brackets directly by the operator. In order to accommodate tires and rims of greater size and weight, means to assist the operator in placing the tires on the mounting brackets 4 may be provided. In one exemplary embodiment, assistance means comprise a loading ramp 16 up which the operator can roll the tire to approximately the height of the mounting bracket 4. In another exemplary embodiment, the tire can be moved from the tire mounting device or area by a mechanical arm or grasping device and moved to the appropriate mounting bracket 4.

In another exemplary embodiment, the subject invention comprises means for rotating the wheel 1. The means could be by hand for certain smaller-size configurations, or alternatively, some motor or similar device. In one exemplary embodiment, the motor is located in the hub 10. In another exemplary embodiment, the motor is located near or adjacent to the outer rim, and rotates the wheel 1 by means of a rotary shaft or wheel in contact with the outer rim. The control for said rotating means may be integral with the rotating means, or may be remote for convenient use by the operator.

An exemplary method of using the subject invention comprises the following steps: placing an uninflated tire mounted on a rim onto a mounting bracket; setting the bead on the tire; connecting an air inflation hose to the tire; starting inflation of the tire; and causing the wheel to rotate one step so that an empty mounting bracket (or a mounting bracket with a fully-inflated tire) is in position to receive the next tire. The above steps are repeated as new tires are placed on the mounting bracket. Preceding tires are continuously being inflated as the device is rotated. Alternatively, the wheel can be rotating continuously during operations instead of rotating one step and stopping with the addition of each new tire. After the tires are fully inflated, which should be at or before the time they reach the location for removal, they are disconnected from the air inflation hose and removed from the wheel when they reach the removal station. The removal station may be the same location as the mounting area, in which case the fully-inflated tire is removed and an uninflated tire then placed on the mounting bracket. Alternatively, the removal station may be at any point along the rotational path of the wheel prior to the mounting area.

Multiple uninflated tires can be placed on mounting brackets prior to beginning inflation. Thus, the steps of an exemplary method where three tires are serviced in this fashion comprise: placing a first uninflated tire onto a mounting bracket; causing the wheel to rotate one step; placing a second uninflated tire onto a mounting bracket; causing the wheel to rotate one step; placing a third uninflated tire onto a mounting bracket; setting the bead on the first, second and third tires; connecting air inflation hoses to the first, second and third tires; starting inflation of the three tires; and causing the wheel to rotate one step. The last step of causing the wheel to rotate one step alternatively may be taken prior to setting the bead on the tires. Or, as noted above, the wheel may be continually rotating during this process.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

I claim:

1. An apparatus for inflating tires, comprising:
    an outer rim with one or more mounting brackets, each mounting bracket adapted to hold a tire, each said mounting bracket comprising an inverted L-shaped bar with a bend of approximately 90 degrees, with a bar extending across the inside of the bend and affixed to the outer rim so that the short part of the L-shape extends inside the outer rim while the long part of the L-shape extends outside the outer rim;
    a center hub, attached to the outer rim by connecting means;
    means for inflating a tire with air when on a mounting bracket; and
    means for causing said outer rim to rotate around the center hub.

2. The apparatus of claim 1, further comprising:
    an air pressure manifold providing air to the inflation means, wherein said air pressure manifold is suspended above the center hub, and rotates in conjunction with the outer rim.

3. The apparatus of claim 1, wherein said connecting means is a plurality of spokes extending from the center hub to the outer rim.

4. The apparatus of claim 1, wherein said inflation means comprises one or more air hoses.

5. The apparatus of claim 1, further comprising a plurality of support wheels supporting the outer rim.

6. The apparatus of claim 1, wherein the mounting bracket further comprises a cross-piece affixed perpendicular to the long part of the L-shape.

7. The apparatus of claim 1, wherein the mounting bracket further comprises two bars affixed at angles to the long pan of the L-shape.

8. The apparatus of claim 1, wherein two or more tires are simultaneously inflated while on the mounting brackets.

9. The apparatus of claim 8, wherein the outer rim periodically rotates so that tires to be inflated can be mounted on the mounting brackets while previously-mounted tires are being inflated.

10. The apparatus of claim 1, wherein the rotating means comprises a motor located in the center hub.

11. The apparatus of claim 1, wherein the outer rim is a circle or polyhedron.

12. A method of inflating multiple tires, comprising the steps of:

mounting a first uninflated tire onto a first mounting bracket affixed to a rotating outer rim;

causing the outer rim to rotate one step;

mounting a second uninflated tire onto a second mounting bracket affixed to the rotating outer rim;

causing the outer rim to rotate one step;

mounting a third uninflated tire onto a third mounting bracket affixed to the rotating outer rim;

setting the bead on the first, second and third uninflated tires;

connecting air inflation hoses to the first, second and third uninflated tires; and initiating inflation of the first, second and third uninflated tires;

wherein each said mounting bracket comprising an inverted L-shaped bar with a bend of approximately 90 degrees, with a bar extending across the inside of the bend and affixed to the outer rim so that the short part of the L-shape extends inside the outer rim while the long part of the L-shape extends outside the outer rim.

* * * * *